(12) United States Patent
Hirayama

(10) Patent No.: US 9,086,534 B2
(45) Date of Patent: Jul. 21, 2015

(54) OPTICAL WAVEGUIDE FORMING RESIN COMPOSITION, OPTICAL WAVEGUIDE AND LIGHT TRANSMISSION FLEXIBLE PRINTED BOARD PRODUCED BY USING THE RESIN COMPOSITION, AND PRODUCTION METHOD FOR THE OPTICAL WAVEGUIDE

(71) Applicant: NITTO DENKO CORPORATION, Ibaraki-shi, Osaka (JP)

(72) Inventor: Tomoyuki Hirayama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 14 days.

(21) Appl. No.: 14/073,228

(22) Filed: Nov. 6, 2013

(65) Prior Publication Data
US 2014/0140672 A1 May 22, 2014

(30) Foreign Application Priority Data
Nov. 19, 2012 (JP) ................. 2012-253599

(51) Int. Cl.
*C03B 37/023* (2006.01)
*G02B 6/02* (2006.01)
*G02B 6/122* (2006.01)
*G02B 6/138* (2006.01)
*B29D 11/00* (2006.01)
*G02B 6/43* (2006.01)

(52) U.S. Cl.
CPC ........ G02B 6/1221 (2013.01); B29D 11/00663 (2013.01); G02B 6/138 (2013.01); G02B 6/43 (2013.01)

(58) Field of Classification Search
CPC ..... G02B 6/02; G02B 6/02395; G02B 6/1847
USPC ............................. 385/123, 141, 144; 65/385
See application file for complete search history.

(56) References Cited

U.S. PATENT DOCUMENTS

| | | | | |
|---|---|---|---|---|
| 2010/0329616 | A1* | 12/2010 | Chen et al. | 385/123 |
| 2011/0286713 | A1* | 11/2011 | Mori et al. | 385/141 |
| 2012/0033913 | A1 | 2/2012 | Kondou et al. | |

FOREIGN PATENT DOCUMENTS

| | | |
|---|---|---|
| JP | 2010-230944 A | 10/2010 |
| JP | 2011-27903 A | 2/2011 |

* cited by examiner

*Primary Examiner* — Eric Wong
*Assistant Examiner* — Mary El Shammaa
(74) *Attorney, Agent, or Firm* — Westerman, Hattori, Daniels & Adrian, LLP

(57) ABSTRACT

There are provided an optical waveguide forming resin composition, an optical waveguide and a light transmission flexible printed board both produced by using the composition, and a production method for the optical waveguide, wherein the resin composition is superior in coatability, capable of omitting a solvent drying step in coating film formation, and suitable as a material for forming an optical waveguide which allows only a low waveguide loss and which has a higher Tg and higher flexibility. An optical waveguide forming resin composition comprises the following components (A) through (D), wherein the optical waveguide forming resin composition is free from a solid resin component and the viscosity thereof under a 25° C. environment is within the range of 10 to 20 mPa·s:
 (A) a liquid oxetane compound;
 (B) a liquid epoxy compound;
 (C) an alkylene glycol; and
 (D) a photoacid generator.

14 Claims, No Drawings

OPTICAL WAVEGUIDE FORMING RESIN COMPOSITION, OPTICAL WAVEGUIDE AND LIGHT TRANSMISSION FLEXIBLE PRINTED BOARD PRODUCED BY USING THE RESIN COMPOSITION, AND PRODUCTION METHOD FOR THE OPTICAL WAVEGUIDE

BACKGROUND OF THE INVENTION

1. Field of the Invention

The present invention relates to an optical waveguide forming resin composition to be used as a material for a cladding layer of an optical waveguide of an optical waveguide apparatus widely used for optical communications, optical information processing and other general optics. The invention also relates to an optical waveguide and a light transmission flexible printed board both produced by using the resin composition, and a production method for the optical waveguide.

2. Description of the Related Art

Optical waveguide cladding materials for light transmission flexible printed boards are required to have higher curing sensitivity (excellent patternability), higher flexibility and a lower refractive index. In designing a material satisfying such requirements, an aliphatic resin is typically selected for a lower refractive index, and a multi-functional aliphatic epoxy resin and a long-chain bi-functional aliphatic epoxy resin, for example, are blended as required to impart excellent patternability and higher flexibility to the material. For a cladding material particularly required to have higher flexibility, therefore, the amount of the long-chain bi-functional aliphatic epoxy resin to be introduced is inevitably increased, so that a cladding layer formed by curing the cladding material tends to have a lower glass transition temperature Tg (see, for example, JP-A-2011-27903 and JP-A-2010-230944).

In a roll-to-roll process for mass production, on the other hand, a dry film technique is generally employed, in which an uncured film is used in the form of a dry film material. In order to adapt the dry film material for the roll-to-roll process, the uncured material is required to have lower tackiness and higher flexibility. In development of the material, however, these requirements reduce the material design flexibility. In the production of a dry film, it is necessary to provide laminate substrates on opposite surfaces of the dry film, resulting in problems associated with resource saving and cost saving. In the material development, it is also important to adapt the material for a wet process in which a liquid material is applied onto a substrate to form a cladding layer and a core layer (JP-A-2010-230944).

In the wet process, a surface smoothing agent (leveling agent) is added to the material or a solvent having a higher boiling point is used to increase the surface smoothness of a coating film in a coating film forming and solvent drying step.

However, the addition of the leveling agent reduces the surface tension of the surface of the coating film, resulting in repellency of a coating liquid in the subsequent coating film forming step. This often adversely influences an optical waveguide loss.

Where the higher boiling point solvent is used instead of the leveling agent, on the other hand, the following problem will be encountered. Where a cladding layer material imparted with the flexibility and hence having a reduced glass transition temperature Tg is used for formation of an under-cladding layer, the higher boiling point solvent in a core layer forming material is dried at a heating temperature higher than the glass transition temperature Tg of the under-cladding layer forming material in a core layer forming and drying step in which a core layer is formed on the under-cladding layer formed from the cladding layer material. Therefore, a resin component of the core layer forming material having a higher refractive index is liable to infiltrate into the under-cladding layer having a lower refractive index. Therefore, light propagating through the core layer is liable to leak into the under-cladding layer, thereby increasing the optical waveguide loss.

Where an optical waveguide is produced in an application which requires the positional accuracy of the optical waveguide (e.g., in production of an opto-electric hybrid board), it is necessary to form three layers including an under-cladding layer, a core layer and an over-cladding layer by a photolithography process (including a coating film forming step, a solvent drying step, an alignment exposing step, a post-heating step, a developing step and a drying step for each of the three layers). This increases the production costs. A technical solution to this problem is highly difficult, but omission of the solvent drying step is a relatively easy approach for reduction in the number of the process steps. Therefore, it is essential to develop a material which permits the omission of the solvent drying step.

Besides the material-based approach, an approach associated with the production process is also contemplated. In this approach, an inkjet coating which can shape a coating film in the coating film forming step without the need for the alignment exposing step, the developing step and the drying step for the reduction in the number of the process steps is required as a coating film forming process for forming the cladding layer.

This coating film forming process, if using a coating varnish containing a solvent, essentially needs the solvent drying step (pre-baking step), making it impossible to maintain the configuration and the dimensions of the cladding layer because of reduction in resin viscosity during heating. The essential need for the solvent drying step correspondingly adds process costs. Therefore, a solvent-free coating varnish having a lower viscosity at an ordinary temperature is demanded.

However, when such a coating varnish is prepared in an industrial bulk scale, resin components are difficult to be mixed together under a solvent-free condition if a solid resin component is contained in the components of the varnish. This will cause a problem that the preparation of a coating varnish requires excessive heating or excessive stirring time or a problem that some components remain undissolved and a coating varnish with a desired formulation is difficult to obtain, and further a problem that solid components are crystallized and haze is generated on exposure to a lower temperature environment.

With such a technical background, the coating varnish preferably contains only a liquid resin as a resin component in order to simplify the coating varnish preparation step and reduce cycle time (process time). There is an eager demand for a solvent-free coating varnish as a cladding layer forming material which satisfies fundamental optical waveguide property requirements (e.g., a higher glass transition temperature Tg and higher flexibility) and contains only the liquid resin as the resin component.

SUMMARY OF THE INVENTION

An optical waveguide forming resin composition, an optical waveguide and a light transmission flexible printed board both produced by using the composition, and a production method for the optical waveguide, are provided wherein the resin composition is superior in coatability, capable of omitting a solvent drying step in coating film formation, and suitable as a material for forming an optical waveguide which allows only a low waveguide loss and which has a higher Tg and higher flexibility.

According to a first aspect, there is provided an optical waveguide forming resin composition comprising the following components (A) through (D), wherein the optical waveguide forming resin composition is free from a solid resin component and the viscosity thereof under a 25° C. environment is within the range of 10 to 20 mPa·s:

(A) a liquid oxetane compound;
(B) a liquid epoxy compound;
(C) an alkylene glycol; and
(D) a photoacid generator.

According to a second aspect, there is provided an optical waveguide in which the cladding layer of the optical waveguide is formed from the optical waveguide forming resin composition according to the first aspect. According to a third aspect, there is provided a light transmission flexible printed board which comprises the optical waveguide according to the second aspect.

According to a fourth aspect, there is provided a production method for an optical waveguide, the method comprising the steps of: applying the optical waveguide forming resin composition according to the first aspect that is free from a solvent component by at least one system selected from the group consisting of an inkjet system, a spin coating system, a masking system, and a dispenser drawing system, and forming a cladding layer of the optical waveguide by photo-curing the applied resin composition without performing a drying step.

If a liquid oxetane compound (A), a liquid epoxy compound (B), and an alkylene glycol (C) are selected as resin components of an optical waveguide forming resin composition as mentioned above and the resin composition is prevented from containing a solid resin component (a multifunctional epoxy polymer, etc.), and if the viscosity of the optical waveguide forming resin composition under a 25° C. environment is brought into the range of 10 to 20 mPa·s, it is possible to attain excellent coatability even if the composition is free from a solvent component (a diluent component irrelevant to curing reactions of resin) and impart higher reactivity through the use of an epoxy-oxetane system as mentioned above. In addition, it becomes possible to impart flexibility by the introduction of the alkylene glycol (C) capable of being captured in an epoxy cured material system and of increasing the distance between crosslinking sites as described above and the intended object is attained successfully although the use of a formulation composed of only lower molecular weight components in terms of viscosity usually results in poor flexibility due to the generation of a cured material having a higher elastic modulus owing to a shortened distance between three-dimensionally crosslinking sites.

As described above, the optical waveguide forming resin composition comprises a liquid oxetane compound (A), a liquid epoxy compound (B), an alkylene glycol (C), and a photoacid generator (D), is free from a solid resin component, and the viscosity thereof under a 25° C. environment is within the range of 10 to 20 mPa·s. Therefore, the resin composition is superior in coatability, and if it is used, for example, as a material for forming a cladding layer of an optical waveguide, it is possible to form a cladding layer that affords a lower optical waveguide loss and has both a higher Tg and higher flexibility. Since the resin composition excels in coatability even if it is free from a solvent component, it becomes possible to omit a solvent drying step in coating film formation and its production cost can be reduced. Moreover, the optical waveguide forming resin composition can be applied to an inkjet system, which is a simple production process, and the like because of its lack of need for a solvent drying step and its viscosity. Furthermore, a core layer can be formed on a cladding layer formed from the resin composition without soaking into the cladding layer even if the core layer is formed, for example, via a wet process.

Particularly, if the proportion of the liquid oxetane compound (A) is 70 wt % or more, the proportion of the liquid epoxy compound (B) is 20 wt % or less, the proportion of the alkylene glycol (C) is 20 wt % or less, and the proportion of (B)+(C) is 30 wt % or less based on the overall amount of resin components of the optical waveguide forming resin composition, a lower viscosity, higher flexibility, and a higher Tg of the optical waveguide forming resin composition can be developed in a balanced fashion.

The optical waveguide forming resin composition can exert excellent performance as a photosensitive varnish for formation of an under-cladding layer of an optical waveguide if the cured product of the resin composition has an elastic modulus of 1.5 GPa or less and a glass transition temperature (Tg) of 80° C. or higher.

The optical waveguide forming resin composition can exert excellent performance as a photosensitive varnish for formation of an over-cladding layer of an optical waveguide if the cured product of the resin composition has an elastic modulus of 1.0 GPa or less and a glass transition temperature (Tg) of not lower than 30° C. and lower than 80° C.

The cladding layer formed by curing the optical waveguide forming resin composition has a lower optical waveguide loss, a higher Tg and higher flexibility (flex resistance). Further, a light transmission flexible printed board is provided which includes the optical waveguide including the cladding layer.

DETAILED DESCRIPTION OF THE INVENTION

Next, the present invention will be described in detail by way of embodiments thereof. It should be understood that the invention be not limited to these embodiments.

<<Optical Waveguide Forming Resin Composition>>

The optical waveguide forming resin composition comprises a liquid oxetane compound (A), a liquid epoxy compound (B), an alkylene glycol (C), and a photoacid generator (D), is free from a solid resin component, and the viscosity thereof under a 25° C. environment is within the range of 10 to 20 mPa·s. The term "liquid" or "solid" means a liquid state or a solid state observed at a temperature of 25° C.

Components including components (A) to (D) will hereinafter be described one by one.

<Liquid Oxetane Compound (A)>

Examples of the liquid oxetane compound (A) include bi-functional aliphatic oxetane monomers, such as di[2-(3-oxetanyl)butyl]ether, and mono-functional aliphatic oxetane monomers represented by the following general formula (1), which may be used either alone or in combination. These compounds may be synthesized with reference to conventionally known techniques, or commercially available products may be bought for preparation of these compounds. Exemplary commercially available products include OXT-221 (available from Toagosei Co., Ltd.). Especially, OXT-221 available from Toagosei Co., Ltd. is preferred in view of curing rate (functional group equivalent weight) and viscosity.

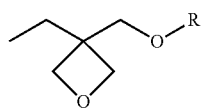

(In the general formula (1), R represents an alkyl group.)

<Liquid Epoxy Compound (B)>

Examples of the liquid epoxy compound (B) include tetra-functional aliphatic epoxy monomers, such as pentaerythritol polyglycidyl ether, tri-functional aliphatic epoxy monomers, such as diglycerol polyglycidyl ether and trimethylolpropane polyglycidyl ether, bi-functional aliphatic epoxy monomers, such as monomers represented by the following general formula (2), mono-functional aliphatic epoxy monomers represented by the following general formula (3), a liquid bisphenol-A epoxy resin, a liquid bisphenol-F epoxy resin, a liquid hydrogenated bisphenol-A epoxy resin, a liquid 3,4-epoxy-cyclohexenylmethyl-3',4'-epoxycyclohexene carboxylate, and a liquid 3,4-epoxycyclohexenylmethyl-3',4'-epoxycyclohexene carboxylate modified with ε-caprolactone, which may be used either alone or in combination. These compounds may be synthesized with reference to conventionally known techniques, or commercially available products may be bought for preparation of these compounds. Examples of the commercially available products include DENACOL EX-321 (available from Nagase ChemteX Corporation), JER828 (available from Mitsubishi Chemical Corporation), EPICLON 830S (available from DIC Corporation), YX8000 (available from Mitsubishi Chemical Corporation), CELLOXIDE 2021P (available from Daicel Chemical Industries, Ltd.), CELLOXIDE 2081 (available from Daicel Chemical Industries, Ltd.), and PG-207N (available from Nippon Steel Chemical Co., Ltd.). Particularly, DENACOL EX-321 available from Nagase ChemteX Corporation is preferred in view of functional group equivalent weight (rapid curability) and viscosity.

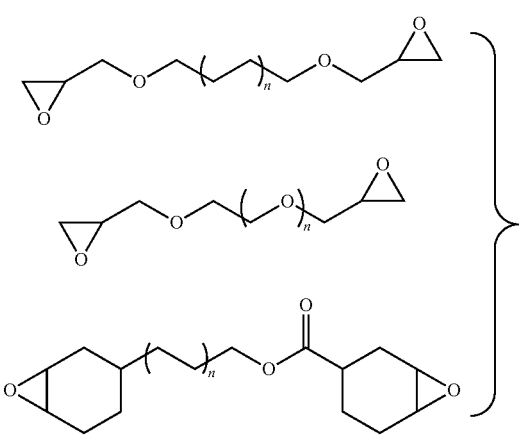

(In the general formula (2), n represents a positive number.)

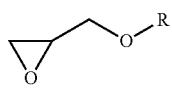

(In the general formula (3), R represents an alkyl group.)

<Alkylene Glycol (C)>

Examples of the alkylene glycol (C) include ethylene glycol, diethylene glycol, triethylene glycol, propylene glycol, and butylene glycol, which may be used either alone or in combination. In particular, ethylene glycol is preferred in view of viscosity.

<Photoacid Generator (D)>

The photoacid generator (D) is blended in the optical waveguide forming resin composition in order to impart the resin composition with photo-curability, e.g., UV-curability.

Examples of the photoacid generator (D) include photopolymerization initiators such as benzoins, benzoin alkyl ethers, acetophenones, aminoacetophenones, anthraquinones, thioxanthones, ketals, benzophenones, xanthones and phosphine oxides. Specific examples of the photopolymerization initiators include triphenylsulfonium antimony hexafluoride, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propane, 2-hydroxy-1-{4-[4-(2-hydroxy-2-methylpropionyl)benz yl]phenyl}-2-methylpropan-1-one, 2-benzyl-2-dimethylamino-1-(4-morpholinophenyl)-butanone-1,2-methyl-1-(4-methylthiophenyl)-2-morpholinopropan-1-one, bis(2,4,6-trimethylbenzoyl)phenylphosphine oxide, 2,4,6-trimethylbenzoyldiphenylphosphine oxide, bis(η5-2,4-cyclopentadien-1-yl)-bis[2,6-difluoro-3-(1H-pyrrol-1-yl) phenyl]titanium and 2-hydroxy-1-{4-[4-(2-hydroxy-2-methylpropionyl)benz yl]phenyl}-2-methylpropan-1-one, which may be used either alone or in combination. Among these compounds, triphenylsulfonium antimony hexa fluoride, 2,2-dimethoxy-1,2-diphenylethan-1-one, 1-hydroxycyclohexyl phenyl ketone and 2-hydroxy-1-{4-[4-(2-hydroxy-2-methylpropionyl)benzyl]phenyl}-2-methylpropan-1-one are preferred for higher curing speed and thicker film curability.

As required, the optical waveguide forming resin composition may contain an additive in addition to the liquid oxetane compound (A), the liquid epoxy compound (B), the alkylene glycol (C), and the photoacid generator (D). Examples of the additive include a silane or titanium coupling agent for increasing the adhesiveness, an olefin oligomer, a cycloolefin oligomer or polymer such as a norbornene polymer, a synthetic rubber, a silicone compound and other flexibilizers, a leveling agent, a defoaming agent and an antioxidant. These additives are each blended in a proportion that does not impair the effects of the present invention. These additives may be used either alone or in combination.

As described previously, the optical waveguide forming resin composition is free from a solid resin component and the viscosity thereof under a 25° C. environment is within the range of 10 to 20 mPa·s. No solid resin component (e.g., a multi-functional epoxy polymer) is used, whereby the optical waveguide forming resin composition that can serve as a cladding layer forming material and that is suitable for a coating varnish can be easily prepared without the use of diluent component irrelevant to the curing reaction of resin components. That is, if a solid resin component such as a multi-functional epoxy polymer is contained, the viscosity of the coating varnish significantly increases. Therefore, it is difficult to adapt the resulting resin composition for a coating process (inkjet coating or the like) which essentially requires a lower viscosity. From this viewpoint, the avoidance of the use of a solid resin component is advantageous for adapting the resin composition to various coating processes. The omission of a diluent component, such as a conventionally used organic solvent, into the optical waveguide forming resin composition enables to omit a solvent drying (pre-baking)

step, thereby reducing production costs in the event that a cladding layer forming material is prepared and used as a coating varnish.

The viscosity of the optical waveguide forming resin composition can be measured, for example, at a temperatures of 25° C. with the use of a standard rotor (1°34'×R24) by means of a MODEL E80 viscometer (RE-80U) available from Toki Sangyo Co., Ltd. The viscosity of the optical waveguide forming resin composition at 25° C. is determined in consideration of the adaptability for an inkjet coating process and the handling ease of the varnish and is required to fall within the range of 10 to 20 mPa·s as described above. This is because the inkjet nozzle head tends to be plugged if the viscosity is excessively high, whereas the thickness of a coating film tends not to be secured if the viscosity is excessively low.

As to the formulation of the optical waveguide forming resin composition, it is particularly preferred that the proportion of the liquid oxetane compound (A) is 70 wt % or more, the proportion of the liquid epoxy compound (B) is 20 wt % or less, the proportion of the alkylene glycol (C) is 20 wt % or less, and the proportion of (B)+(C) is 30 wt % or less based on the overall amount of resin components of the optical waveguide forming resin composition because a lower viscosity, higher flexibility, and a higher Tg of the optical waveguide forming resin composition can be developed in a balanced fashion. If the proportion of the liquid oxetane compound (A) is less than 70 wt %, the viscosity becomes higher and it tends to be difficult to obtain high sensitivity in an oxetane-epoxy mixed system. If the proportion of the liquid epoxy compound (B) is greater than 20 wt %, the viscosity tends to become higher. If the proportion of the alkylene glycol (C) is greater than 20 wt %, repellency and unevenness will occur in curing and no uniform coating film tends to be obtained.

As to the formulation of the optical waveguide forming resin composition, it is preferred that the content of the photoacid generator (D) is set to 0.1 to 10 parts by weight, more preferably 0.5 to 5 parts by weight, particularly preferably 1 to 3 parts by weight, based on 100 parts by weight of the resin components of the optical waveguide forming resin composition. If the content of the photoacid generator (D) is excessively small, it is difficult to provide satisfactory photo-curability by irradiation with ultraviolet radiation. If the content of the photoacid generator (D) is excessively great, the photosensitivity is increased, resulting in abnormal pattern configuration and shorter pot life of the varnish.

In an under-cladding application, it is preferred for the optical waveguide forming resin composition that the cured product thereof has an elastic modulus of 1.5 GPa or less (more preferably 1.0 to 1.5 GPa) and a glass transition temperature (Tg) of 80° C. or higher because the resin composition can exert excellent performance as a photosensitive varnish for formation of an under-cladding layer of an optical waveguide This is because if the glass transition temperature (Tg) is lower than 80° C., soaking into the under-cladding layer occurs during the prebaking in the core preparation and light guided in the core soaks out to the under-cladding side, causing deterioration of the loss. If the elastic modulus is higher than 1.5 GPa, cracks are sometimes formed during the evaluation of bendability and such an elastic modulus results in failure to satisfy the bendability evaluation.

In an over-cladding application, it is preferred for the optical waveguide forming resin composition that the cured product thereof has an elastic modulus of 1.0 GPa or less (more preferably 0.4 to 1.0 GPa) and a glass transition temperature (Tg) of not lower than 30° C. and lower than 80° C. because the resin composition can exert excellent performance as a photosensitive varnish for formation of an over-cladding layer of an optical waveguide. In the optical waveguide forming resin composition, there is a rough proportional correlation between the Tg and the elastic modulus, and if the Tg is set to 80° C. or higher, the elastic modulus will fall approximately within the range exceeding 1.0 GPa and therefore it becomes difficult to secure flexibility. A glass transition temperature (Tg) within a room temperature region lower than 30° C. is thought not to be practical because a resin composition having such a Tg is always in a state that the temperature thereof is higher than the Tg, and therefore there is a concern that characteristic properties deteriorate with a change in shape. Therefore, it is preferred to set the glass transition temperature (Tg) as described above. If the elastic modulus is higher than 1.0 GPa, cracks are sometimes formed during the evaluation of bendability and such an elastic modulus results in failure to satisfy the bendability evaluation.

The Tg and the elastic modulus are measured in the following ways, for example. That is, each photosensitive varnish is applied with an applicator onto a 1.1 mm thick glass substrate. The resulting uncured film is exposed to light at 5000 mJ/cm$^2$ (with an I-line filter) and then subjected to a post-heat treatment (at 130° C. for 10 minutes) to provide a cured product. The cured product is separated from the glass substrate with a cutter blade to provide a cured film to be measured (thickness: 50 μm). Subsequently, the elastic modulus is determined from the E' value at 25° C. by means of a dynamic viscoelasticity analyzer (RSA3 available from TA Instruments Ltd.) and the Tg can be determined from the tan δ value.

<<Optical Waveguide>>

An optical waveguide will be described, which is produced by using the optical waveguide forming resin composition as a cladding layer forming material.

The optical waveguide to be obtained includes, for example, a substrate, a cladding layer (under-cladding layer) formed in a predetermined pattern on the substrate, a core layer formed in a predetermined pattern on the cladding layer for transmission of an optical signal, and a cladding layer (over-cladding layer) formed over the core layer. In the optical waveguide to be obtained, the cladding layer is formed from the optical waveguide forming resin composition. Particularly, the optical waveguide forming resin composition is preferably used as both an under-cladding layer forming material and an over-cladding layer forming material. In the optical waveguide to be obtained, the cladding layer is required to have a lower refractive index than the core layer.

The cladding layer that is a cured product and formed by using the optical waveguide forming resin composition preferably has a refractive index of not higher than 1.56, particularly preferably not higher than 1.55. The refractive index of the cladding layer (cured) is measured, for example, in the following manner. A cladding layer (cured) having a thickness of about 10 μm is formed on a smooth surface of a silicon wafer, and the refractive index at 850 nm of the cured cladding layer is measured by means of a prism coupler (SPA-4000) available from SAIRON TECHNOLOGY, Inc.

The optical waveguide can be produced, for example, through the following steps. A substrate is prepared, and a photosensitive varnish of the optical waveguide forming resin composition is applied on the substrate. A photomask for exposure in a predetermined pattern (optical waveguide pattern) is provided on the resulting varnish coating film, and then light, such as ultraviolet radiation, is applied through the photomask and, as required, heat treatment is applied to cure the varnish. Thereafter, a portion unexposed to the light is dissolved away with the use of a developing liquid. Thus, an under-cladding layer (a lower portion of a cladding layer) in a predetermined pattern is formed.

In turn, a core layer forming material (varnish) is applied onto the under-cladding layer to form a core formation layer (an uncured layer). Subsequently, a photomask for exposure in a predetermined pattern (optical waveguide pattern) is provided on the core formation layer, and then light, such as ultraviolet radiation, is applied through the photomask and, as required, heat treatment is applied. Thereafter, an unexposed portion of the core formation layer is dissolved away with the use of a developing liquid. Thus, a core layer in a predetermined pattern is formed.

Subsequently, the over-cladding layer forming material is applied over the core layer, followed by irradiation with light such as ultraviolet radiation and, as required, heat treatment. Thus, an over-cladding layer (an upper portion of the cladding layer) is formed. Through these process steps, an intended optical waveguide can be produced.

Exemplary materials for the substrate include a silicon wafer, a metal substrate, a polymer film and a glass substrate. Examples of the metal substrate include plates of stainless steel such as of SUS. Specific examples of the polymer film include a polyethylene terephthalate (PET) film, a polyethylene naphthalate film and a polyimide film. The substrate usually has a thickness of 10 μm to 3 mm.

In the light irradiation, specifically, irradiation with ultraviolet radiation is conducted. Exemplary light sources for the irradiation with ultraviolet radiation include a low pressure mercury lamp, a high pressure mercury lamp and an ultrahigh pressure mercury lamp. The dose of the ultraviolet radiation is usually about 10 to about 20000 mJ/cm$^2$, preferably about 100 to about 15000 mJ/cm$^2$, more preferably about 500 to about 10000 mJ/cm$^2$.

After the exposure by the irradiation with ultraviolet radiation, a heat treatment may further be performed in order to complete curing due to photoreaction. Conditions for the heat treatment typically include a temperature of 80° C. to 250° C., preferably 100° C. to 150° C. and a period of 10 seconds to 2 hours, preferably 5 minutes to 1 hour.

Where the optical waveguide forming resin composition is used as the cladding layer forming material, a resin composition containing a solid multi-functional aromatic epoxy resin, a solid (viscous) fluorene-containing bi-functional epoxy resin, and optionally any of the various photoacid generators described above, for example, is used as the core layer forming material. Where the core layer forming material is prepared in the form of a varnish for coating, the resin composition is mixed with a proper amount of a conventionally known organic solvent so as to attain a viscosity suitable for the coating.

Examples of the organic solvent include ethyl lactate, methyl ethyl ketone, cyclohexanone, ethyl lactate, 2-butanone, N,N-dimethylacetamide, diglyme, diethylene glycol methyl ethyl ether, propylene glycol methyl acetate, propylene glycol monomethyl ether, tetramethylfuran and dimethoxyethane. These organic solvents may be used either alone or in combination in a proper amount so as to impart the resin composition with a viscosity suitable for the coating.

Exemplary methods for application of each of the layer forming materials on the substrate include coating methods employing a spin coater, a coater, a round coater, a bar coater or the like, a screen printing method, a capillary injection method in which the material is injected into a gap formed with the use of spacers by the capillary phenomenon, and a continuous roll-to-roll coating method employing a coating machine such as a multi-coater. The optical waveguide may be provided in the form of a film optical waveguide by removing the substrate.

Since the optical waveguide forming resin composition is lower in viscosity and higher in sensitivity, it can be applied by such a system as an inkjet system, a spin coating system, a masking system, and a dispenser drawing system even if the composition is free from a solvent component, and such omission of a solvent component allows the resin composition to form a cladding layer of an optical waveguide by photo-curing the applied resin composition without performing a drying step after the application.

The optical waveguide thus obtained can be used, for example, as an optical waveguide for a light transmission flexible printed board because the cladding layer thereof exhibits a lower optical waveguide loss and has a higher Tg and higher flexibility (flex resistance).

EXAMPLES

The present invention will be described by way of inventive examples thereof together with comparative examples. However, it should be understood that the present invention be not limited to these inventive examples.

Inventive Example 1

Preparation of Photosensitive Varnish (UC-I)

Under shaded conditions, 95 g of a liquid bi-functional semi-aliphatic oxetane monomer (OXT-221, available from Toagosei Co., Ltd.), 3 g of a liquid aliphatic tri-functional epoxy monomer (DENACOL EX-321, available from Nagase ChemteX Corporation), 2 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then the resulting mixture was filtered under higher temperature and higher pressure conditions through a membrane filter having a pore diameter of 1.0 μm. Thus, a cladding layer-forming photosensitive varnish (UC-I) was prepared.

Inventive Example 2

Preparation of Photosensitive Varnish (UC-II)

Under shaded conditions, 90 g of a liquid bi-functional semi-aliphatic oxetane monomer (OXT-221, available from Toagosei Co., Ltd.), 5 g of a liquid aliphatic tri-functional epoxy monomer (DENACOL EX-321, available from Nagase ChemteX Corporation), 5 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (UC-II) was prepared.

Inventive Example 3

Preparation of Photosensitive Varnish (UC-III)

Under shaded conditions, 85 g of a liquid bi-functional semi-aliphatic oxetane monomer (OXT-221, available from Toagosei Co., Ltd.), 5 g of a liquid aliphatic tri-functional epoxy monomer (DENACOL EX-321, available from Nagase ChemteX Corporation), 10 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (UC-III) was prepared.

Inventive Example 4

Preparation of Photosensitive Varnish (UC-IV)

Under shaded conditions, 80 g of a liquid bi-functional semi-aliphatic oxetane monomer (OXT-221, available from Toagosei Co., Ltd.), 10 g of an alicyclic bi-functional aliphatic epoxy monomer (CELLOXIDE 2021P, available from Daicel Chemical Industries, Ltd.), 10 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (UC-IV) was prepared.

Inventive Example 5

Preparation of Photosensitive Varnish (UC-V)

Under shaded conditions, 70 g of a liquid bi-functional semi-aliphatic oxetane monomer (OXT-221, available from Toagosei Co., Ltd.), 20 g of an alicyclic bi-functional aliphatic epoxy monomer (CELLOXIDE 2021P, available from Daicel Chemical Industries, Ltd.), 10 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (UC-V) was prepared.

Inventive Example 6

Preparation of Photosensitive Varnish (OC-i)

Under shaded conditions, 80 g of a liquid bi-functional semi-aliphatic oxetane monomer (OXT-221, available from Toagosei Co., Ltd.), 10 g of a liquid aliphatic tri-functional epoxy monomer (DENACOL EX-321, available from Nagase ChemteX Corporation), 10 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (OC-i) was prepared.

Inventive Example 7

Preparation of Photosensitive Varnish (OC-ii)

Under shaded conditions, 70 g of a liquid bi-functional semi-aliphatic oxetane monomer (OXT-221, available from Toagosei Co., Ltd.), 10 g of a liquid aliphatic tri-functional epoxy monomer (DENACOL EX-321, available from Nagase ChemteX Corporation), 20 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (OC-ii) was prepared.

Inventive Example 8

Preparation of Photosensitive Varnish (OC-iii)

Under shaded conditions, 70 g of a liquid bi-functional semi-aliphatic oxetane monomer (OXT-221, available from Toagosei Co., Ltd.), 20 g of a liquid aliphatic tri-functional epoxy monomer (DENACOL EX-321, available from Nagase ChemteX Corporation), 10 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (OC-iii) was prepared.

Comparative Example 1

Under shaded conditions, 100 g of a liquid bi-functional semi-aliphatic oxetane monomer (OXT-221, available from Toagosei Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (Comparative Example 1) was prepared.

Comparative Example 2

Under shaded conditions, 95 g of a liquid bi-functional semi-aliphatic oxetane monomer (OXT-221, available from Toagosei Co., Ltd.), 5 g of a liquid aliphatic tri-functional epoxy monomer (DENACOL EX-321, available from Nagase ChemteX Corporation), and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (Comparative Example 2) was prepared.

Comparative Example 3

Under shaded conditions, 60 g of a liquid bi-functional semi-aliphatic oxetane monomer (OXT-221, available from Toagosei Co., Ltd.), 20 g of a liquid aliphatic tri-functional epoxy monomer (DENACOL EX-321, available from Nagase ChemteX Corporation), 20 g of ethylene glycol (available from Shoei Chemical Co., Ltd.) and 2 g of a photoacid generator (ADEKAOPTOMER SP-170 (50 wt % solution) available from Adeka Corporation) were mixed together and stirred with a hybrid mixer, and then filtration was conducted in the same manner as for UC-I. Thus, a cladding layer-forming photosensitive varnish (Comparative Example 3) was prepared.

Using each of the thus-obtained photosensitive varnishes, characteristic properties were evaluated in accordance with the following criteria. The results are shown in Table 1 provided below together with the formulations of the respective photosensitive varnishes.

<Viscosity Measurement>

The viscosity at 25° C. of each photosensitive varnish was measured with a standard rotor (1°34'×R24) by means of a MODEL E80 viscometer (RE-80U) available from Toki Sangyo Co., Ltd.

<Tg Measurement, Elastic Modulus Measurement>

Each photosensitive varnish was applied with an applicator onto a 1.1 mm thick glass substrate. The resulting uncured film was exposed to light at 5000 mJ/cm$^2$ (with an I-line filter) and then subjected to a post heat treatment (at 130° C. for 10 minutes) to provide a cured product. The cured product was separated from the glass substrate with a cutter blade to provide a cured film to be measured (thickness: 50 μm). Subsequently, using the cured film, the elastic modulus was determined from the E' value at 25° C. by means of a dynamic viscoelasticity analyzer (RSA3 available from TA Instruments Ltd.) and the Tg was determined from the tan δ value.

<Refractive Index Measurement>

Each photosensitive varnish was applied with a spin coater onto a 0.8 mm thick silicon wafer. The resulting uncured film was exposed to light at 5000 mJ/cm$^2$ (with an I-line filter) and then subjected to a post-heat treatment (at 130° C. for 10 minutes) to provide a cured film. Using this cured film as a sample (thickness: 10 μm) for refractive index evaluation, the refractive index at 850 nm was measured with a prism coupler (SPA-4000) available from SAIRON TECHNOLOGY, Inc.

<Curing Unevenness>

Each photosensitive varnish was applied with an applicator onto a 1.1 mm thick glass substrate. The resulting uncured film was exposed to light at 5000 mJ/cm$^2$ (with an I-line filter) and then cured by conducting a post-heat treatment (at 130° C. for 10 minutes). At this time, the evenness of the cured film surface was checked visually. The case where curing unevenness was not confirmed was evaluated as "acceptable (○)", whereas the case where curing unevenness was observed as "unacceptable (x)".

Next, the optical waveguides (Inventive Examples 9 to 23) prepared using the photosensitive varnishes prepared in Inventive Examples 1 to 8 as cladding layer forming materials are evaluated.

Inventive Examples 9 to 23

Prior to the production of an optical waveguide according to these examples, photosensitive varnishes as core layer forming materials were prepared as follows. Using the photosensitive varnishes (UC-I to V) of Inventive Examples 1 to 5 as varnishes for formation of under-cladding layers and the photosensitive varnishes (OC-i to iii) of Inventive Examples 6 to 8 as varnishes for formation of over-cladding layers in the combinations given in the following Table 2, optical waveguides were prepared by forming the respective layers in accordance with the procedures described below.

<Preparation of Core Layer Forming Material>

Under shaded conditions, 50 g of a solid multi-functional aromatic epoxy resin (YDCN-700-10 available from Nippon Steel Chemical Co., Ltd.), 50 g of a solid (viscous) fluorene-containing bi-functional epoxy resin (OGSOL-EG-200 available from Osaka Gas Chemicals Co., Ltd.) and 2.0 g of a photoacid generator (ADEKAOPTOMER SP-170 (50 wt % solution) available from Adeka Corporation) were mixed with 50 g of ethyl lactate, and completely dissolved in ethyl lactate at 85° C. with heating and stirring. Then, the resulting mixture was cooled to a room temperature (25° C.), and filtered under higher temperature and higher pressure conditions with the use of a membrane filter having a pore diameter of 1.0 μm. Thus, a photosensitive varnish was prepared as the core layer forming material.

(Preparation of FPC-Integrated Optical Waveguide)

<Formation of Under-Cladding Layer>

A varnish for formation of an under-cladding layer was applied with a spin coater to a back surface of a flexible printed board substrate (FPC substrate) having an overall

TABLE 1

| | Inventive Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| OXT-221 | 95 | 90 | 85 | 80 | 70 | 80 | 70 | 70 | 100 | 95 | 60 |
| DENACOL EX-321 | 3 | 5 | 5 | — | — | 10 | 10 | 20 | — | 5 | 20 |
| CELLOXIDE 2021P | — | — | — | 10 | 20 | — | — | — | — | — | — |
| Ethylene glycol | 2 | 5 | 10 | 10 | 10 | 10 | 20 | 10 | — | — | 20 |
| ADEKAOPTOMER SP-170 | 2 | 2 | 2 | 2 | 2 | 2 | 2 | 2 | 2 | 2 | 2 |
| Viscosity (mPa · s) | 13 | 14 | 15 | 16 | 19 | 16 | 18 | 20 | 12 | 14 | 21 |
| Elastic Modulus (GPa) | 1.3 | 1.2 | 1.2 | 0.9 | 1.1 | 0.9 | 0.4 | 1.0 | — | — | 0.3 |
| Refractive Index | 1.51 | 1.51 | 1.51 | 1.51 | 1.52 | 1.51 | 1.51 | 1.51 | 1.51 | 1.51 | 1.51 |
| Tg (° C.) | 110 | 105 | 91 | 85 | 82 | 80 | 42 | 70 | — | — | 35 |
| Curing unevenness | ○ | ○ | ○ | ○ | ○ | ○ | ○ | ○ | — | — | x |

The results shown above reveal that the photosensitive varnishes of the Inventive Examples were low in viscosity, did not exhibit curing unevenness, and were satisfactory in the values of Tg, elastic modulus, and refractive index. On the other hand, the photosensitive varnishes of Comparative Examples 1 and 2 had lower viscosities, but since their cured products were fragile, they were difficult to be formed into film. Therefore, no Tg measurement, no elastic modulus measurement, and no curing unevenness measurement/evaluation could be conducted. The photosensitive varnish of Comparative Example 3 was higher in viscosity and lower in the values of Tg and elastic modulus compared with the photosensitive varnishes of the Inventive Examples and exhibited curing unevenness.

thickness of 22 μm, then exposed to light via a predetermined mask pattern (pattern width/pattern pitch (L/S)=50 μm/200 μm) with a UV irradiation machine (at 5000 mJ/cm$^2$ (with an I-line filter)), and then subjected to a post-heat treatment (at 130° C. for 10 minutes). Thereafter, the resulting post-heated layer was developed in γ-butyrolactone (at 25° C. for 3 minutes), rinsed with water, and then dried on a hot plate (at 120° C. for 10 minutes) to remove water. Thus, an under-cladding layer (having a thickness of 20 μm) was formed.

<Formation of Core Layer>

The photosensitive varnish as the core layer forming material was applied over the thus formed under-cladding layer by means of a spin coater, and then the organic solvent was dried on a hot plate (at 130° C. for 5 minutes). Thus, a core formation layer was formed in an uncured film state. The uncured core formation layer thus formed was exposed to light via a predetermined mask pattern (pattern width/pattern pitch (L/S)=50 μm/200 μm) by means of a UV irradiation machine (at 9000 mJ/cm$^2$ (with an I-line filter)), and then subjected to a post-heat treatment (at 130° C. for 10 minutes). Thereafter, the resulting core formation layer was developed in γ-butyrolactone (at 25° C. for 4 minutes) and rinsed with water, and then dried on a hot plate (at 120° C. for 10 minutes) to remove water. Thus, a core layer (having a thickness of 50 μm) having a predetermined pattern was formed.

<Formation of Over-Cladding Layer>

A varnish for formation of an over-cladding layer was applied over the thus formed core layer by means of a spin coater, whereby an uncured over-cladding layer was formed. The uncured over-cladding layer thus formed was exposed to light by means of a UV irradiation machine (at 5000 mJ/cm$^2$ (with an I-line filter)), and then subjected to a post-heat treatment (at 130° C. for 10 minutes). Thereafter, the resulting over-cladding layer was developed in γ-butyrolactone (at 25° C. for 3 minutes) and rinsed with water, and then dried on a hot plate (at 120° C. for 10 minutes) to remove water. Thus, an over-cladding layer (having a thickness of 10 μm) was formed.

In this manner, an FPC-integrated optical waveguide (having an overall waveguide thickness of 80 μm) was produced, in which the under-cladding layer had been formed on the FPC substrate, the core layer in the predetermined pattern had been formed on the under-cladding layer, and the over-cladding layer had been formed on the core layer.

Using each of the optical waveguides obtained in the manner described above, characteristic properties were evaluated in accordance with the following criteria. The results are summarized in Table 2 given below.

<Linear Loss>

The optical waveguides were each used as a sample. Light emitted from a light source (850-nm VCSEL light source OP250 available from Miki Inc.) was collected and inputted into the sample by means of a multi-mode fiber (FFP-G120-0500 available from Miki Inc., having an MMF diameter of 50 μm and an NA of 0.2). Subsequently, light outputted from the sample was collected by a lens (FH14-11 available from Seiwa Optical Co., Ltd., having a magnification of 20 and an NA of 0.4), and detected at 6 channels by a light measurement system (optical multi-power meter Q8221 available from Advantest Corporation) for evaluation. The sample was evaluated for the linear loss from an average total loss for the six channels based on the following criteria:

Acceptable (○): A sample having a total linear loss of not greater than 0.1 dB/cm Unacceptable (x): A sample having a total linear loss of greater than 0.1 dB/cm <Bend Loss>

The optical waveguides were each used as a sample. The sample was wound 360 degrees around a metal rod having a diameter of 2 mm, and light emitted from a light source (850-nm VCSEL light source OP250 available from Miki Inc.) was collected and inputted into the sample by means of a multi-mode fiber (FFP-G120-0500 available from Miki Inc., having an MMF diameter of 50 μm and an NA of 0.2). Subsequently, light outputted from the sample was collected by a lens (FH14-11 available from Seiwa Optical Co., Ltd., having a magnification of 20 and an NA of 0.4), and detected at 6 channels by a light measurement system (optical multi-power meter Q8221 available from Advantest Corporation) for evaluation. A difference between an average total loss for the six channels and the total linear loss determined in the aforementioned manner was calculated as the bend loss. Consequently, the sample was evaluated based on the following criteria:

Acceptable (○): A sample having a loss increased by not greater than 0.5 dB as compared with the initial value Unacceptable (x): A sample having a loss increased by greater than 0.5 dB as compared with the initial value <Flexibility>

Pieces cut out into 50 mm from the respective optical waveguides were used as samples for evaluation of the flexibility. Using the samples for evaluation of flexibility, an IPC slide test was performed with a bending radius r of 2.0 mm, a sliding distance of 20 mm, a sliding speed of 20 mm/sec (in one way) and a stop period of zero. Consequently, the sample was evaluated based on the following criteria:

Acceptable (○): A sample not suffering from breakage even after being bent 100,000 or more times Unacceptable (x): A sample suffering from breakage when being bent less than 100,000 times

TABLE 2

| | Inventive Example | | | | | | | | | | | | | | |
|---|---|---|---|---|---|---|---|---|---|---|---|---|---|---|---|
| | 9 | 10 | 11 | 12 | 13 | 14 | 15 | 16 | 17 | 18 | 19 | 20 | 21 | 22 | 23 |
| Varnish (UC-) | I | I | I | II | II | II | III | III | III | IV | IV | IV | V | V | V |
| Varnish (OC-) | i | ii | iii | i | ii | iii | i | ii | iii | i | i | iii | i | i | iii |
| Linear loss | ○ | ○ | ○ | ○ | ○ | ○ | ○ | ○ | ○ | ○ | ○ | ○ | ○ | ○ | ○ |
| Bend loss | ○ | ○ | ○ | ○ | ○ | ○ | ○ | ○ | ○ | ○ | ○ | ○ | ○ | ○ | ○ |
| Flexibility | ○ | ○ | ○ | ○ | ○ | ○ | ○ | ○ | ○ | ○ | ○ | ○ | ○ | ○ | ○ |

From the results given in the above table, none of the optical waveguides of the Inventive Examples was evaluated as "unacceptable (x)" for the respective characteristic properties, and all of the optical waveguides were suppressed in increase in refractive index and were excellent in both linear loss and bend loss. Thus, the optical waveguides of the Inventive Examples were well-balanced in characteristic properties. Although the cladding layers were each formed without performing the solvent drying step in Inventive Examples, the resulting optical waveguides satisfied the fundamental optical waveguide property requirements (lower losses and higher flexibility).

The optical waveguide forming resin composition is useful as a material for forming a component of an optical waveguide, particularly as a cladding layer forming material. The optical waveguide produced by using the optical waveguide forming resin composition is used, for example, for a light transmission flexible printed board and the like.

Although specific forms of embodiments of the instant invention have been described above in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical waveguide forming resin composition, comprising:
(A) a liquid oxetane compound;
(B) a liquid epoxy compound;

(C) an alkylene glycol; and
(D) a photoacid generator,
wherein the optical waveguide forming resin composition is free from a solid resin component and the viscosity thereof under a 25° C. environment is within the range of 10 to 20 mPa·s, and
wherein the proportion of the liquid oxetane compound (A) is 70 wt % or more, the proportion of the liquid epoxy compound (B) is 20 wt % or less, the proportion of the alkylene glycol (C) is 20 wt % or less, and the proportion of (B)+(C) is 30 wt % or less based on an overall amount of resin components of the optical waveguide forming resin composition.

2. The optical waveguide forming resin composition according to claim 1, wherein a material produced therefrom by curing has an elastic modulus of 1.5 GPa or less and a glass transition temperature (Tg) of 80° C. or higher, and the resin composition is used as a photosensitive varnish for formation of an under-cladding layer of an optical waveguide.

3. The optical waveguide forming resin composition according to claim 1, wherein a material produced therefrom by curing has an elastic modulus of 1.0 GPa or less and a glass transition temperature (Tg) of not lower than 30° C. and lower than 80° C., and the resin composition is used as a photosensitive varnish for formation of an over-cladding layer of an optical waveguide.

4. An optical waveguide, wherein a cladding layer of the optical waveguide is formed from the optical waveguide forming resin composition according to claim 1.

5. A light transmission flexible printed board comprising the optical waveguide according to claim 4.

6. An optical waveguide forming resin composition, comprising:
(A) a liquid oxetane compound;
(B) a liquid epoxy compound;
(C) an alkylene glycol; and
(D) a photoacid generator,
wherein the optical waveguide forming resin composition is free from a solid resin component and the viscosity thereof under a 25° C. environment is within the range of 10 to 20 mPa·s, and
wherein a material produced from the optical waveguide forming resin composition by curing has an elastic modulus of 1.5 GPa or less and a glass transition temperature (Tg) of 80° C. or higher, and the resin composition is used as a photosensitive varnish for formation of an under-cladding layer of an optical waveguide.

7. An optical waveguide, wherein an under-cladding layer of the optical waveguide is formed from the optical waveguide forming resin composition according to claim 6.

8. A light transmission flexible printed board comprising the optical waveguide according to claim 7.

9. An optical waveguide forming resin composition, comprising:
(A) a liquid oxetane compound;
(B) a liquid epoxy compound;
(C) an alkylene glycol; and
(D) a photoacid generator,
wherein the optical waveguide forming resin composition is free from a solid resin component and the viscosity thereof under a 25° C. environment is within the range of 10 to 20 mPa·s, and
wherein a material produced from the optical waveguide forming resin composition by curing has an elastic modulus of 1.0 GPa or less and a glass transition temperature (Tg) of not lower than 30° C. and lower than 80° C., and the resin composition is used as a photosensitive varnish for formation of an over-cladding layer of an optical waveguide.

10. An optical waveguide, wherein an over-cladding layer of the optical waveguide is formed from the optical waveguide forming resin composition according to claim 9.

11. A light transmission flexible printed board comprising the optical waveguide according to claim 10.

12. A production method for an optical waveguide, the method comprising:
applying the optical waveguide forming resin composition according to claim 1 that is free from a solvent component, by at least one system selected from the group consisting of an inkjet system, a spin coating system, a masking system, and a dispenser drawing system, and
forming a cladding layer of the optical waveguide by photo-curing the applied resin composition without performing a drying step.

13. A production method for an optical waveguide, the method comprising:
applying the optical waveguide forming resin composition according to claim 6 that is free from a solvent component, by at least one system selected from the group consisting of an inkjet system, a spin coating system, a masking system, and a dispenser drawing system, and
forming an under-cladding layer of the optical waveguide by photo-curing the applied resin composition without performing a drying step.

14. A production method for an optical waveguide, the method comprising:
applying the optical waveguide forming resin composition according to claim 9 that is free from a solvent component, by at least one system selected from the group consisting of an inkjet system, a spin coating system, a masking system, and a dispenser drawing system, and
forming an over-cladding layer of the optical waveguide by photo-curing the applied resin composition without performing a drying step.

* * * * *